United States Patent
Pyza et al.

(10) Patent No.: US 11,073,220 B2
(45) Date of Patent: Jul. 27, 2021

(54) ELECTROMAGNETIC VALVE DEVICE AND SYSTEM

(71) Applicant: ETO Magnetic GmbH, Stockach (DE)

(72) Inventors: Andrzej Pyza, Chrzastawa Wielka (PL); Marcin Nieweglowski, Jelenia Góra (PL); Michael Feindler, Stockach (DE)

(73) Assignee: ETO MAGNETIC GMBH, Stockach (DE)

( * ) Notice: Subject to any disclaimer, the term of this patent is extended or adjusted under 35 U.S.C. 154(b) by 35 days.

(21) Appl. No.: 16/306,005

(22) PCT Filed: Mar. 30, 2017

(86) PCT No.: PCT/EP2017/057622
§ 371 (c)(1),
(2) Date: Feb. 4, 2019

(87) PCT Pub. No.: WO2017/207130
PCT Pub. Date: Dec. 7, 2017

(65) Prior Publication Data
US 2019/0264828 A1    Aug. 29, 2019

(30) Foreign Application Priority Data
May 30, 2016    (DE) .................... 10 2016 109 865.5

(51) Int. Cl.
*F16K 31/06*    (2006.01)
*F15B 13/04*    (2006.01)
(Continued)

(52) U.S. Cl.
CPC ...... *F16K 31/0613* (2013.01); *F15B 13/0402* (2013.01); *F15B 13/0442* (2013.01);
(Continued)

(58) Field of Classification Search
CPC .............. F16K 31/0613; F15B 13/0402; F15B 2013/0448
(Continued)

(56) References Cited

U.S. PATENT DOCUMENTS

2014/0239211 A1    8/2014 Morgan et al.
2015/0144202 A1*   5/2015 Fathauer ............. F16H 61/0251
                                                                    137/15.21

FOREIGN PATENT DOCUMENTS

CN    101617156 B    8/2011
CN    103277534 A    9/2013
(Continued)

OTHER PUBLICATIONS

Original and Translation of CN 103277534; Chen Danyan; Zhao Gaizhou; Li Haiying; Yu Yanjing; Liu Gang; Liu Baolin; Guo Xianghong; Lu Chao; Tian Yuejun; Sep. 4, 2013.*
(Continued)

*Primary Examiner* — Paul J Gray
(74) *Attorney, Agent, or Firm* — Bachman and Lapointe PC; George Coury

(57) ABSTRACT

An electromagnetic valve device including armature means (12, 14), which are movable along an axial direction for actuating a valve gate assembly group (28) in reaction to energizing stationary spool means (16), and which are accommodated in an actuator housing (17, 19, 20, 22) preferably as a component unit and/or module in conjunction with the spool means and stationary core means and take up an inserted and/or retracted armature position (FIG. 1) in an unenergized state of the spool means, said valve gate assembly group (28), which is guided in a valve housing (26), being realized at one axial end for a contacting interaction, which cannot endure tensile load, with the armature means (14) and being realized such that a fluid path from a first fluid port (P) of the valve housing to a second (Continued)

fluid port (A) of the valve housing can be opened or blocked depending on an axial position of the valve gate assembly group, said valve housing (26) including at least one axial fluid-conducting channel section (50) on the interior so as to interact with the valve gate assembly group (28) guided therein, in particular at the axial end side opposite to the armature means, said channel section (50) being realized such that the valve gate assembly group (28) blocks the fluid path in the axial position of the valve gate assembly group corresponding to the inserted and/or retracted armature position and said valve gate assembly group (28) opening the fluid path via the flow-conducting channel section (50) in an axial position of the valve gate assembly group, which is moved out of the inserted and/or retracted armature position.

18 Claims, 2 Drawing Sheets

(51) Int. Cl.
    *F15B 13/044* (2006.01)
    *F16K 11/07* (2006.01)
    *F16K 27/04* (2006.01)

(52) U.S. Cl.
    CPC .......... *F16K 11/07* (2013.01); *F16K 11/0708* (2013.01); *F16K 27/041* (2013.01)

(58) Field of Classification Search
    USPC ........................................ 137/625.64, 625.69
    See application file for complete search history.

(56) References Cited

FOREIGN PATENT DOCUMENTS

| | | |
|---|---|---|
| DE | 10213554 A1 | 10/2002 |
| DE | 102005022501 A1 | 11/2006 |

OTHER PUBLICATIONS

International search report for patent application No. PCT/EP2017/057622 dated Jun. 14, 2017.

\* cited by examiner

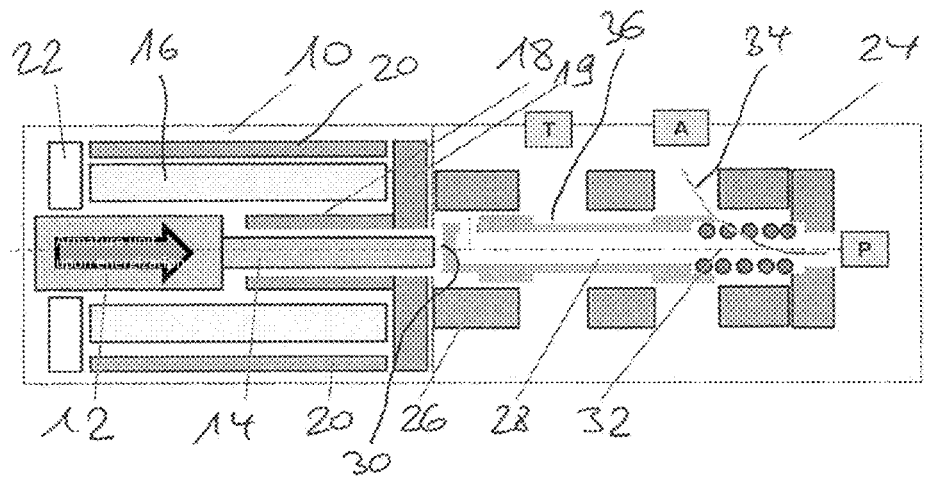
Fig. 5 Prior Art
Fig. 6 Prior Art
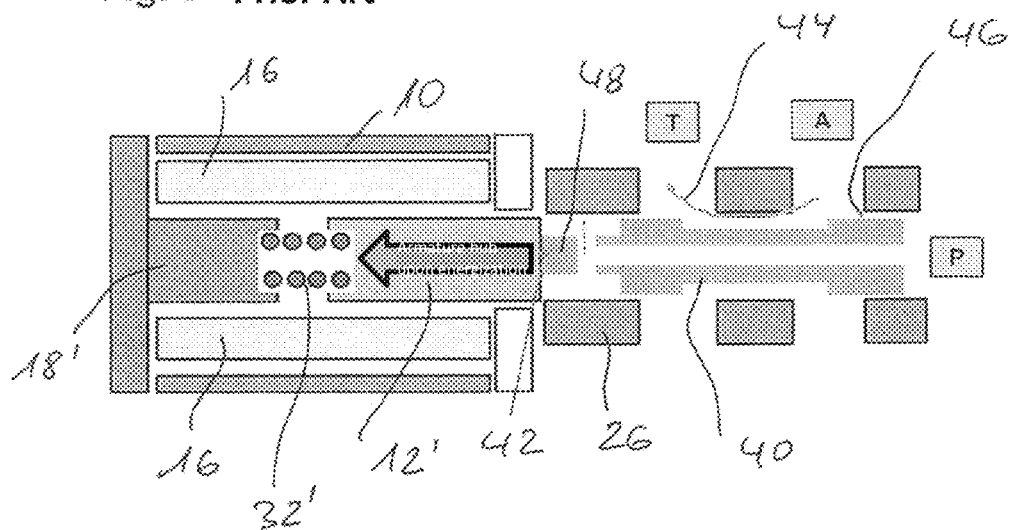

ELECTROMAGNETIC VALVE DEVICE AND SYSTEM

BACKGROUND OF THE INVENTION

The present invention relates to an electromagnetic valve device according to the preamble of the main claim. Furthermore, the present invention relates to a system comprising such an electromagnetic valve device.

From the state of the art, electromagnetic actuators are generally known, in which an armature unit, which is movable relative to stationary core means in reaction to stationary spool means being energized, drives a valve gate unit and effects the valve functionality, according to a corresponding actuating position. Not only owing to their simple constructive design, their manufacturability suitable for mass production and their mechanic reliability are generic valve devices commonplace in a large number of applications. In this context, uses relating to switching fluid are preferred in an automobile or automotive context, although the use is not limited to this technical field.

FIG. 5 depicting the state of the art elucidates the general design of a valve device (realized mostly radially symmetrically around a longitudinal axis extending horizontally) according to the preamble in a schematic view along longitudinal cutting plane. Thus, an actuator assembly group 10, which is preferably designed modularly and is outlined by the dashed line illustrated on the left-hand side in the view in FIG. 5, comprises armature means comprising an armature body 12 and an armature plunger 14, which is tightly fitted thereon and is reduced in diameter. These armature means can be moved to an expelled position (to the right in FIG. 5) along the axial direction (i.e. along the horizontally extending line of symmetry in FIG. 1) from the retracted or inserted armature position illustrated in FIG. 5 by energizing a stationary spool unit 16, an electromagnetically generated flow circuit being closed for this armature movement by an armature or yoke section 18, a magnetically conductive housing section 20 on the jacket side as well as a left-hand front-sided lid or yoke section 22 so that the actuator is moved along the arrow direction in FIG. 5 upon energization.

This modular actuator unit 10 interacts with a valve housing unit 24 (symbolically illustrated by the right-hand dashed outline in FIG. 5) forming the valve fluid ports P (as a typical pressure port), A (as a work port) and T (as a ventilation port), said ports P, A and T being realized as openings in a polymeric valve housing 26, which is elongated along the axial direction, in said valve housing unit 24. A valve gate assembly group 28 is guided so as to be axially movable in the interior of this valve housing 26, said valve gate assembly group 28 repelling itself at a left-hand end 30 (front surface) of an outer front surface of the armature plunger section 14 upon contact, without the component groups 14 and 28 being firmly connected to each other. A compression spring 32, which is provided in the right-hand end area of the valve gate assembly group 28 and repels itself from a front-side end area (in the area of the pressure port P), preloads the valve gate assembly group 28 against the armature means 12, 14 (more explicitly against the front surface of the armature plunger section 14 on the end side).

In the thus realized manner illustrated in FIG. 5, a 3/2 valve is realized, namely a valve in which two actuating positions (alternatively or in a further embodiment intermediary positions also suitable in the make of a proportional valve) can be actuated and/or controlled by moving the armature means 12, 14 and by correspondingly driving the valve gate assembly group 28, and the illustrated state of the art according to FIG. 5 representing a so-called normally open state, namely an open fluid channel between the (first) fluid port P disposed on the front side on the valve housing and the adjacent (second) fluid port as a work port A disposed on the jacket side on the valve housing 26; the bent arrow 34 symbolizing said open fluid path 34 in the illustrated unenergized state of the spool means 16.

The illustrated valve comprises three fluid ports; besides the already described ports P and A, which form the (first) fluid path 34, a third fluid port, a ventilation port T in this instance, is provided which is disposed axially adjacent to the work port (second fluid port) in the direction of the actuator unit 10 and closes the further fluid path A-T via a suitable formation or profiling of the valve gate assembly group in the operating mode of FIG. 5 (unenergized spool unit so that the fluid path 34 P-A is open). When the spool means 16 have been energized and the armature means 12, 14 have been consequently moved to the right and have consequently tracked the valve gate assembly group 28 to the right against the returning effect of the pressure spring 32, an indentation or recess 36 would, in contrast, be positioned on the jacket side on the valve gate assembly group such that a fluid communication between A and T is enabled in lieu when closing the first fluid path (arrow direction 34 being disrupted).

Accordingly, the technology illustrated in FIG. 5 is also referred to as a normally open (NO) valve formation, in reference to P-A.

While such a technology illustrated in FIG. 5 has proven itself in everyday practice and finds use in a number of technical applications, it is nonetheless still commonly preferred not to realize an electromagnetic valve device, as in FIG. 5, as normally open (NO); in order to ensure a blocked state of the valve in the event of a power outage or the like, for example, it generally is of advantage to configure an electromagnetic valve of the illustrated type, in particular as a 3/2 valve, as normally closed (NC) in such a manner that an unenergized armature position (and defined, for example, by abutting spring means) closes the fluid path P-A.

However, the principle geometry illustrated in FIG. 5 does not allow realizing a normally closed (NC) valve topology without further ado. Indeed a modification in particular of the actuator assembly group is required for this, as is illustrated also schematically in FIG. 6; it is presumed for the further discussion that the design according to FIG. 6 is generally known. In the further discussion, in particular also for the subsequent description of exemplary embodiments of the invention, the same reference numerals apply to components and/or function elements which are the same or equivalent in function.

In FIG. 6, the actuator assembly group is realized by an armature body 12' which is pulled towards a left-hand core unit 18' in reaction to the spool means 16 being energized, a compression spring 32', which is disposed between the armature body 12' and the stationary core 18', being compressed upon the armature unit 12' being energized and consequently moved (to the left according to the arrow in FIG. 6).

A valve gate assembly group 40 is tightly fitted on a connection position 42 (e.g. by being glued or a different tight connection technique) on a front surface of the armature body 12 illustrated on the right-hand side in FIG. 6 by its left-hand end section 48 so that the valve gate assembly group 40 accordingly tracks to the left when the armature is moved to the left according to the arrow direction upon energization. The unenergized state is illustrated in FIG. 6;

when a fluid path 44 A-T is open, a fluid communication P-A is blocked, symbolically illustrated by reference numeral 46.

Energizing the spool means 16 and consequently moving the armature 12' to the left opens the fluid path P-A at the position 46 whereas the fluid path A-T (arrow 44) is simultaneously blocked by the right-side (enlarged) end area of the valve gate assembly group 40, 42.

While such a technical design is common and has been tried and tested, in particular the design of the actuator assembly group for an NC configuration (FIG. 6) with respect to the NO configuration (FIG. 5) poses a large constructive difference so that in particular a flexible adjustment or conversion of the electromagnetic valves from NO to NC or vice versa in the way of a production is either difficult or impossible—the actuator groups would have to be changed in every instance, with the additional problem in the case of the NC configuration according to FIG. 6 being that the required connection which can also be tensile-loaded has to be firm between the armature means of the valve gate assembly group, i.e. a separate connection (gluing) process being required which in addition is sensitive to faults and damages, for example in the instance of vibration loads or the like. It is also sensible and advantageous on magnetic and/or hysteresis related grounds to mechanically uncouple the armature means from the valve gate assembly group, in particular if the valve gate assembly group is made of magnetically relevant material.

SUMMARY OF THE INVENTION

It is therefore the object of the present invention to realize an electromagnetic valve device according to the preamble of the main claim in such a manner that a modification or production conversion from a valve device suitable for a normally open operation to an electromagnetic valve device suitable for a normally closed operation is enabled by largely maintaining the actuator design in an actuator housing using little additional expenditure. In this context, a portion of common parts is in particular to be increased and an inexpensive, automatable production is to be enabled more preferably.

The object is attained by the electromagnetic valve device having the features of the main claim; advantageous embodiments of the invention are described in the dependent claims.

In an advantageous manner according to the invention, the valve housing is provided with at least one axial flow-conducting channel section so as to be able to interact with the valve gate assembly group guided in the valve housing, said channel section being realized such that the fluid path is blocked in the axial position of the valve gate assembly group corresponding to the inserted or retracted armature position—said axial position not being connected to the armature means in a tight manner or manner capable of being tensile-loaded but instead merely being subjected to push by the armature means—whereas the fluid path from the first fluid port (preferably P) to the second fluid port (preferably A) being open via the at least one axially fluid-conducting channel section after energizing the spool means and removing the armature means from the inserted or retracted armature position.

In this context, it is advantageously realized according to the invention that an NC functionality can be effected constructively easily and under practically unchanged usability of an actuator unit of the type illustrated in FIG. 5 merely by subjecting a valve gate, which is loosely fitted, to pressure, said NC functionality being able to be effected by the channel section according to the invention being closed in the unenergized state in an interaction between the valve gate assembly group and the surrounding section of the valve housing and by the fluid path being closed accordingly, whereas an extraction of the armature unit effected by energization and accordingly a tracking by the valve gate assembly group subjected to pressure open or expose said at least one channel section such that fluid flow becomes possible owing to this.

In this context, the flow-conducting channel section is provided in a plurality in the scope of preferred further embodiments of the invention; more preferably and in a largely radially symmetrical embodiment in particular at the respective end of the valve housing or rather the valve gate assembly group, such a channel section is disposed in a plurality around the inner circumference of the housing section so that the fluid path is realized via the sum of the individual channel sections even at a low flow resistance.

It is also advantageous in the scope of preferred further embodiments of the invention to advantageously provide the first fluid port as a pressure port in this further embodiment, provided on the front side of the valve housing and thus preferably along the axial direction, whereas the second fluid port (and further fluid ports, where applicable) are disposed in a lateral housing area, in particular a jacket area, of the valve housing. It is then geometrically possible that the fluid-conducting channel section of the valve housing according to the invention is disposed, at least in sections along the axial direction or parallel to the axial direction, between the first and the second fluid port (itself disposed along the axial direction).

It is moreover particularly preferred if, in one embodiment of the electromagnetic valve device, energy storing means act on the valve gate assembly group and/or the armature means in such a manner that a returning force arises in the inserted or retracted armature position; particularly advantageously, this occurs by realizing the energy storage means of the further embodiment as a compression spring which additionally advantageously in this further embodiment engage at the front side and/or in an axial end area of the valve gate assembly group opposite to the armature means, it then in turn being advantageous to support such a compression spring at the other end at a corresponding section or abutment of the valve housing.

Particularly preferred is the embodiment of the present invention as a 3/2 valve, either as a switch or proportional valve, a further (third) port is preferably provided for this purpose and is more preferably disposed in a lateral area of the valve housing adjacent to the second fluid port in direction to the armature means. By means of a suitable design in particular of the valve gate assembly group, a functionality can be generated such that the valve gate assembly group opens or releases a further fluid path from the second to the additional third fluid path in the axial position of the valve gate assembly group blocking the fluid path between the first and the second fluid port (i.e. in the unenergized state). In contrast, the valve gate assembly group would be realized such (by correspondingly molding or shaping) that the further fluid path (second to third fluid port) is blocked when energizing and moving the armature means from the retracted position when opening the fluid path between the first and the second fluid port. This functionality can be realized as a switch or a proportional valve, this, by the way, being enabled for the principally possible embodiment of the invention 2/2 valve, i.e. merely using the first and the second fluid port.

The geometry, which has been attained via the present invention and is mostly unchanged, in the design of the actuator assembly group, which in the scope of preferred embodiments of the invention can also be realized in particular as a component unit or module (which can be separately provided and produced), enables creating a component kit in the make of a system concept according to the invention merely by exchanging and/or providing a NO mode (for example analogous to the embodiment according to FIG. 5) and then, for switching from NO to NC and vice versa, merely one other valve component group consisting of a valve housing and a valve gate assembly group guided therein is exchanged or mounted in the component kit in each instance so that significant advantages can be realized in particular in a flexible (and mostly automatable) series production.

Nevertheless, this advantageous further embodiment does not preclude the present invention from also forming, constructively advantageously, a spool carrier, for example, according to the invention in the spool means in one piece with the valve housing according to the invention (this could also apply to the modification in the scope of the system) so that production and tool costs could be reduced in this manner.

BRIEF DESCRIPTION OF THE DRAWINGS

Further advantages, features and details of the invention can be derived from the following description of preferred exemplary embodiments as well as from the drawings. In the following.

FIG. 5 illustrates a schematic illustration of an electromagnetic valve device presumed to be known device in NO topology according to the state of the art; and FIG. 6 illustrates in a schematic longitudinal sectional view analogous to FIG. 5 an electromagnetic valve device presumed to be known from the state of the art in NO topology according to the state of the art.

DETAILED DESCRIPTION

Figure 1:
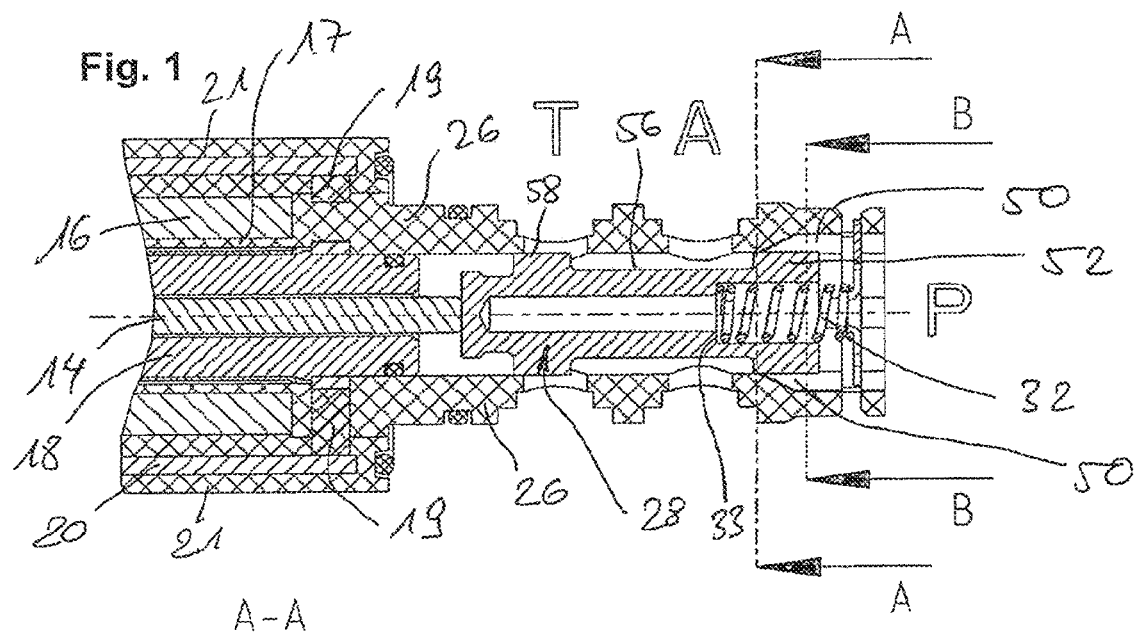
FIG. 1 illustrates a schematic partial sectional view of the electromagnetic valve device according to a first exemplary embodiment of the invention in NC configuration, with FIG. 1 illustrating the unenergized, closed and blocked state.
Figure 2:
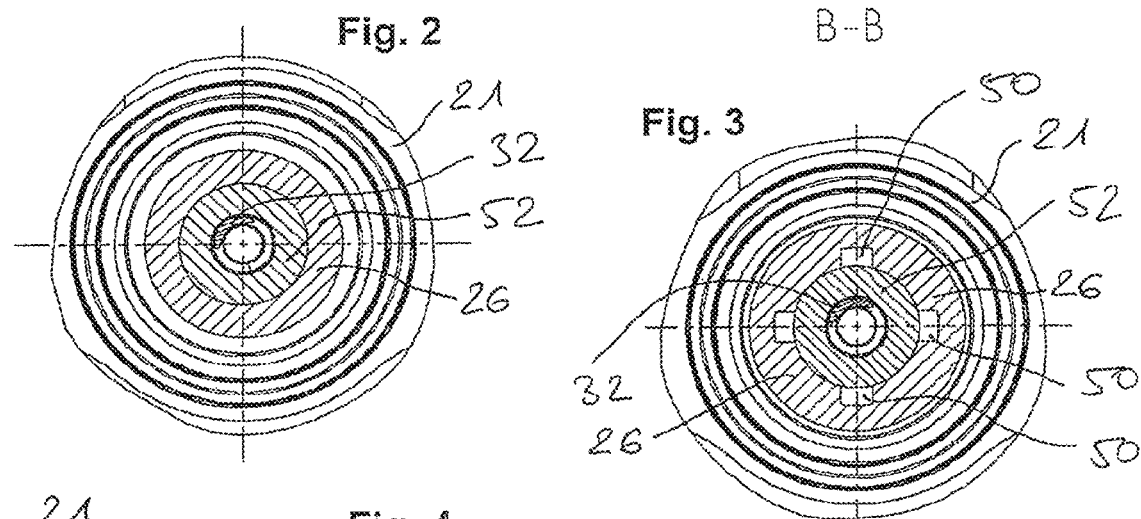
FIG. 2 illustrates a cross-sectional view along the cutting plane A-A in FIG. 1.
Figure 3:
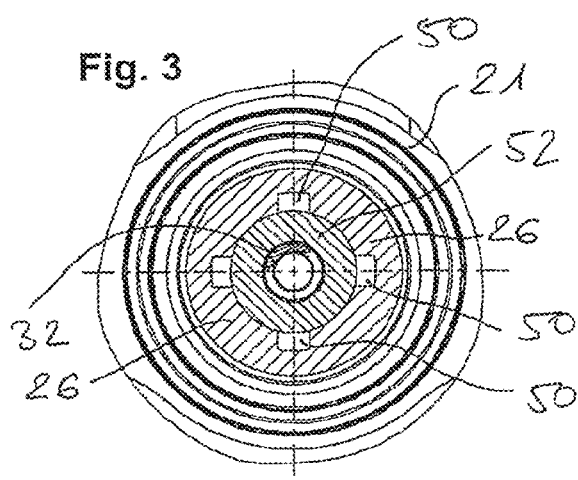
FIG. 3 illustrates a cross-sectional view along the cutting plane B-B in FIG. 1.

The exemplary embodiment illustrated in FIGS. 1 to 4 elucidates a possibility of implementing the inventive idea; where identical to FIGS. 5 and 6, the reference numerals used in FIGS. 1 to 4 correspond to component groups which are identical or equivalent in function.

The armature means (merely illustrated in the form of a plunger 14) are thus guided in a surrounding stationary core section 18 which in turn is connected to a yoke section 19 and to a surrounding housing shell 20 in a magnetically flow-conducting manner. A spool winding 16 is held on a (plastic) spool carrier 17 which in the exemplary embodiment transitions in one piece to a valve housing 26 which is realized hollow-cylindrical on the inside, extends coaxially to the horizontally extending symmetry or longitudinal axis and is open on the front side for realizing the first fluid port P and on the jacket side for the second (A) or third (T) fluid port. A valve gate assembly group 28, which sits loosely on the free end of the armature plunger 14, is preloaded against the direction of movement of the armature means, wherein a compression spring 32 is formed on the right-hand inner area of the armature plunger component group, said compression spring 32 supporting itself at the right-hand end of the valve housing 26 and on the left at an annular ledge 33 formed in the interior of the valve gate assembly group.

In the right-hand area of the figure plane, the valve housing 26 comprises four channel sections 50 which are dispersed along the inner circumference and are molded into the plastic material of the valve housing 26, which becomes tapered towards the armature means as seen in a longitudinal cut. For this purpose, an end section 52 of the valve gate assembly group 28 is formed cylindrical such that it blocks the fluid path P-A in the operating mode of FIG. 1 (unenergized spool means 16, therefore inserted operating state of the armature means); the channel section 50 is not exposed in this relative position of the section 52 whereas in the energized operating state of the valve device according to FIG. 4 (extended state of the armature means, thus the position state of the valve gate assembly group 28 tracked or displaced to the right) the section 52 opens or exposes the channel sections 50 to the work port A so that a fluid communication (open in the energized state) to the first fluid port A is possible via the pressure port P and the channel sections 50.

Figure 4:
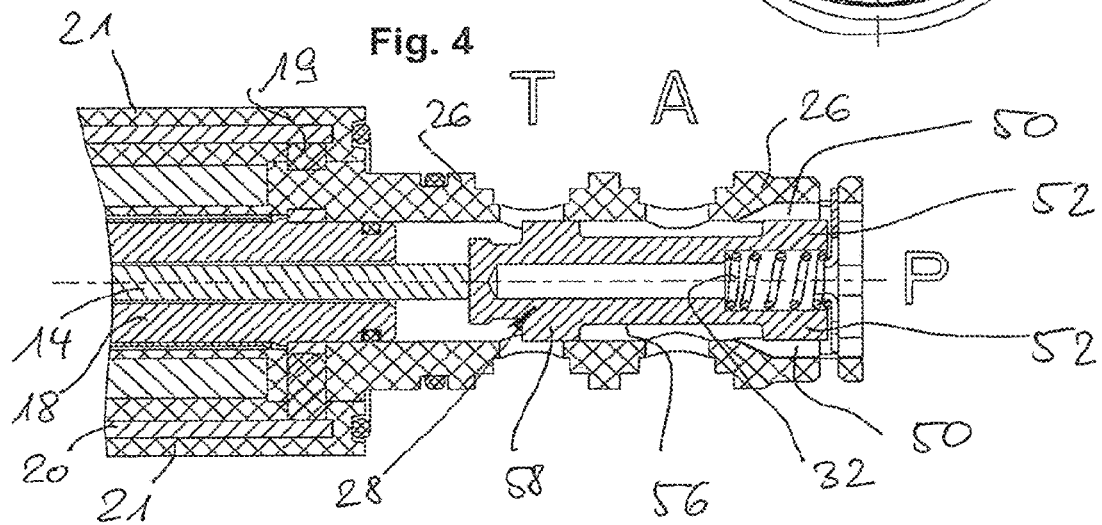
FIG. 4 illustrates a longitudinal sectional view analogous to FIG. 1, though in the energized state of the spool means and thus in the inserted or retracted armature position (armature position displaced towards the right) for opening the fluid path P-A.

At the same time, it becomes clear that an indentation 56 on the jacket side and provided at the valve gate unit in the middle jacket area impacts the fluid flow between A (second fluid port) and P (third fluid port): the communication A-P is open in the operating state of FIG. 1, NC for A-P, whereas in the unenergized state, A-P open, the valve gate assembly group blocks a fluid communication A-T using a left-hand cylindrical sealing section 58 (FIG. 4). Termination of the energization causes the valve gate assembly group 28 or the armature means to return to the inserted, retracted operating position of FIG. 1 by means of the spiral spring 32.

It becomes clear a tight connection, which can be tensile-loaded, between the armature plunger 14 and the valve gate assembly group 28 is not required but rather this functionality is effected solely by the thrust of the armature unit 14 or the return by means of the spring means 32.

This embodiment additionally advantageously enables the NC topology of the electromagnetic valve illustrated in FIGS. 1 to 4 in the exemplary embodiment to be exchanged for an NO topology of the electromagnetic valve, which is designed analogous to the schematic illustration in FIG. 5, by simply exchanging the valve housing 26. In particular the general design of the electromagnetic actuating elements remains unchanged, it in particular being possible in this additional embodiment to provide separate component groups instead of providing the spool carrier 17 and valve housing 26 in one piece as illustrated in the exemplary embodiment of FIGS. 1 to 4 so that in particular the complete actuator housing (for which a plastic molding 21 of the metallic housing component group 20 is intended in the exemplary embodiment of FIGS. 1 to 4) can also be individually provided as a module-like or component unit and can then be combined with a suitable valve housing technology having a suitably fitted valve gate.

The invention claimed is:

1. An electromagnetic valve device comprising armature means (12, 14), which are movable along an axial direction for actuating a valve gate assembly group (28) in reaction to energizing stationary spool means (16), and which are accommodated in an actuator housing (17, 19, 20, 22) and take up a retracted armature position (FIG. 1) in an unenergized state of the spool means, said valve gate assembly group (28), which is guided in a valve housing (26), having one axial end for a contacting interaction, which cannot endure tensile load, with the armature means (14) and being configured such that a fluid path from a first fluid port (P) of the valve housing to a second fluid port (A) of the valve housing can be opened or blocked depending on an axial position of the valve gate assembly group, wherein the valve housing (26) comprises at least one axially fluid-conducting channel section (50) on an interior of the valve housing, said at least one axially fluid-conducting channel section (50) being configured such that the valve gate assembly group (28) interacts with a surrounding section of the valve housing (26) to block the fluid path in the axial position of the valve gate assembly group (FIG. 1) corresponding to the retracted armature position and the valve gate assembly group (28) opens the fluid path via said at least one axially fluid-conducting channel section (50) in a second axial position of the valve gate assembly group (FIG. 4) corresponding to the armature means being moved out of the retracted armature position, wherein, in the axial position of the valve gate assembly group (28) corresponding to the retracted armature position, the fluid path is blocked by interaction between a radially outward portion of the valve gate assembly group and a radially inward portion of the valve housing (26).

2. The device according to claim 1, wherein said at least one axially fluid-conducting channel section (50) connected to the first fluid port (P) is axially close towards the armature means such that the valve gate assembly group (28) sits in the valve housing (26) in a sealed manner when blocking the fluid path in the retracted position and the valve gate assembly group (28) exposes said at least one axially fluid-conducting channel section (50) to the second fluid port (A) in the second axial position.

3. The device according to claim 1, wherein said at least one axially fluid-conducting channel section (50) comprises a plurality of individual channel sections.

4. The device according to claim 1, wherein the first fluid port (P) is disposed at a front side of the valve housing and wherein the second fluid port (A) is disposed at a lateral housing area of the valve housing (26) in such a manner that said at least one axially fluid-conducting channel section of the valve housing is between the first and the second fluid port in the axial direction.

5. The device according to claim 1, further comprising energy storage means (32), which act on the valve gate assembly group (28) and/or the armature means (14) so as to urge the valve gate assembly group (28) and/or the armature means (14) into the retracted armature position.

6. The device according to claim 5, wherein the energy storage means are disposed at a front side and/or in an axial end area (52) of the valve gate assembly group opposite to the armature means so as to abut against the valve gate assembly group.

7. The device according to claim 1, further comprising a third fluid port (T) which is disposed in the valve housing, is disposed adjacent to the second fluid port (A) in a direction to the actuator housing (10) and is configured such that the valve gate assembly group (28) opens another fluid path from the second fluid port to the third fluid port in the second axial position, said another fluid path being blocked if the fluid path between the first fluid port and the second fluid port is open.

8. The device according to claim 7, wherein the valve device is realized as a 3/2 shift valve or proportional valve.

9. The device according to claim 1, wherein the electromagnetic valve device is configured so as to be mounted to the valve housing by axially joining to the actuator housing as a structural unit or module, said valve housing comprising the valve gate assembly group.

10. The device according to claim 1, wherein the valve housing or a component group of a multi-piece valve housing is configured in one piece having a spool carrier of the stationary spool means.

11. A system comprising the electromagnetic valve device according to claim 1, further comprising an additional valve gate assembly group that can be exchanged for the valve gate assembly group and/or an additional valve housing that can be exchanged for the valve housing, wherein the additional valve gate assembly group or additional valve housing is configured such that, when installed in the electromagnetic valve device, the fluid path between the first fluid port and the second fluid port is open in the retracted armature position and wherein the fluid path between the first fluid port and the second fluid port is blocked in the second axial position.

12. The device according to claim wherein the armature means (12) are accommodated in the actuator sing as a component unit and/or module in conjunction with the stationary spool means.

13. The device according to claim 1, wherein the at least one axially fluid-conducting channel section interacts with the valve gate assembly group guided therein at an axial end side opposite to the armature means.

14. The device according to claim 3, wherein the plurality of individual channel sections are evenly dispersed around an inner circumference in a hollow-cylindrical area of the valve housing.

15. The device according to claim 4, wherein the lateral housing area is a jacket area.

16. The device according to claim 5, wherein the energy storage means are compression springs.

17. The device according to claim 6, wherein the energy storage means are supported at: the valve housing.

18. The device according to claim 1, wherein said at least one axially fluid-conducting channel section (50) is defined on a radially inwardly facing surface of the valve housing (26).

* * * * *

UNITED STATES PATENT AND TRADEMARK OFFICE
CERTIFICATE OF CORRECTION

PATENT NO. : 11,073,220 B2  
APPLICATION NO. : 16/306005  
DATED : July 27, 2021  
INVENTOR(S) : Andrzej Pyza et al.

Page 1 of 1

It is certified that error appears in the above-identified patent and that said Letters Patent is hereby corrected as shown below:

In the Claims

Column 8, Line 35, after claim --1-- should be inserted.

Column 8, Line 36, after actuator "sing" should be corrected to read --housing--.

Column 8, Line 52, "at:" should be corrected to read --at--.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*